United States Patent [19]

Davis et al.

[11] 4,396,053

[45] Aug. 2, 1983

[54] PNEUMATIC TIRE INCLUDING A CURABLE, STORAGE-STABLE AND SOLVENTLESS SINGLE COMPONENT SEALANT COMPOSITION

[75] Inventors: James A. Davis, Uniontown; Russell W. Koch, Hartville, both of Ohio

[73] Assignee: The Firestone Tire & Rubber Company, Akron, Ohio

[21] Appl. No.: 255,131

[22] Filed: Apr. 17, 1981

[51] Int. Cl.$^3$ ............... B60C 27/00; C08G 18/62; C08K 5/01; C08J 3/22
[52] U.S. Cl. ............... 152/347; 524/705; 524/764; 524/871; 524/798; 528/75
[58] Field of Search ............... 260/25, 27 R, 27 BB, 260/33.6 AQ, 33.6 UB, 42.25, 42.56; 152/347; 528/75; 524/705, 764, 871

[56] References Cited

U.S. PATENT DOCUMENTS

| | | | |
|---|---|---|---|
| 3,427,366 | 2/1969 | Verdol et al. | 260/859 |
| 3,714,110 | 1/1973 | Verdol et al. | 260/33.6 AQ |
| 3,935,893 | 2/1976 | Stang et al. | 156/115 |
| 3,981,342 | 9/1976 | Farber et al. | 152/347 |
| 4,032,500 | 6/1977 | Koch et al. | 260/33.6 AQ |
| 4,102,567 | 3/1977 | Loveless | 526/48 |
| 4,109,695 | 8/1978 | Miyazato | 152/347 |
| 4,109,696 | 8/1978 | Nakasaki et al. | 152/354 |
| 4,116,895 | 9/1978 | Kageyama et al. | 260/5 |
| 4,152,309 | 5/1979 | Ijichi et al. | 260/27 BB |
| 4,161,202 | 7/1979 | Powell et al. | 152/347 |
| 4,163,467 | 8/1979 | Dobson | 152/347 |

FOREIGN PATENT DOCUMENTS

| | | |
|---|---|---|
| 765304 | 5/1976 | South Africa . |
| 777707 | 12/1976 | South Africa . |
| 1540638 | 2/1979 | United Kingdom . |

*Primary Examiner*—H. S. Cockeram
*Attorney, Agent, or Firm*—Daniel N. Hall

[57] ABSTRACT

A curable, storage-stable and solventless single component sealant for pneumatic tires having as its essential sealant functioning components a liquid low molecular weight hydroxy terminated polybutadiene diol, an antioxidant, a polymeric isocyanate, and, a polyurethane catalyst; this sealant can be blended with a sealant optimizing amount of a masterbatch.

10 Claims, No Drawings

PNEUMATIC TIRE INCLUDING A CURABLE, STORAGE-STABLE AND SOLVENTLESS SINGLE COMPONENT SEALANT COMPOSITION

BACKGROUND OF THE INVENTION AND DESCRIPTION OF THE PRIOR ART

It is known in the prior art to utilize both voidfree elastomer fillers, as well as those of prescribed porosity, to completely fill the core of a tire. Such an elastomeric filler is normally derived from a prepolymer of an organic polyisocyanate and polyether or a polyester. In addition to the complete filling of a tire core as heretofore described, various sealant compositions are taught in the art, for example, one-shot recipes containing essentially butyl rubber, active carbon and sulfur as the main sealant ingredients.

It is known to be optional, for example, to utilize a phenol formaldehyde resin to effect a thermosetting cure of the inner portion of a penetrating nail to fix said nail as it has pierced the tire casing and the sealant composition applied therein. It is further known in the art to utilize a self-sealing single-component composition in combination with the inner surface of a pneumatic tire, such a composition containing a partially cured butyl rubber in combination with a curing agent and an auxiliary curing agent such as black iron oxide. Numerous other single-component sealant compositions are known in the art and require a controlled balance of properties to be maintained after application of the sealant to the inner surface of a pneumatic tire, primarily in the adjacent tread and sidewall portions.

U.S. Pat. No. 3,981,342 is directed to a puncture sealing composition for pneumatic tires, said composition containing a mixture of high and low molecular weight elastomers, the latter being present in an amount more than 50%, partial curing of the mixture maintains the flow, rigidity and strength of the total mix and functions effectively as a sealant; examples of high molecular weight elastomers disclosed include polyisoprene, polybutadiene, butyl rubbers and EPDM elastomer types. Examples of low molecular elastomers that are of a molecular weight less than 50,000 include liquid polybutene, liquid EPDM and liquid butyl rubber.

U.S. Pat. No. 4,032,500 is directed to a curable polyurethane sealant two-component system, each composition component being storage-stable and containing medium process oil-extended low molecular weight uncured butyl rubber which remains uncured; the components are mixed in a volume ratio of about 1.0 to 1.0. The first component contains NCO terminated prepolymer and the second component contains the low molecular weight polyol reactant for said prepolymer.

U.S. Pat. No. 4,116,895 is directed to an emulsified puncture sealant composition for a tubeless pneumatic tire, said composition comprising a butyl rubber emulsion, at least one saturated hydrocarbon polymer emulsion, a cross-linking agent for the rubber and a crosslinking activator. This puncture sealant composition can also include at least one additional rubber component selected from the group consisting of diene type unsaturated hydrocarbon polymer emulsions and a natural rubber latex, this being in addition to the other specified components.

DESCRIPTION OF THE INVENTION

The present invention is directed to a curable, storage-stable and solventless single component sealant for pneumatic tires said sealant having as its essential sealant functioning components a liquid low molecular weight hydroxy terminated polybutadiene diol, an antioxidant, a polymeric isocyanate, the ratio of NCO/OH being within the range of from about 0.4/1.0 to about 1.2/1.0, and, a conventional polyurethane catalyst, for example, an organotin mercaptide catalyst. In its preferred embodiment, the present and above-defined sealant composition of this invention is combined with a masterbatch for optimization.

THE INVENTION

The present invention is directed to a solventless sealant composition for use in pneumatic tires containing an air-retaining liner forming an integral part of said tire and for use in inner tubes contained within a tire casing. The sealant composition is applied to the inside of such a tire to function with the integral air-retaining liner to seal any hole that may be formed in said liner by a piercing object, such as a nail. When injected onto an inner liner or into an inner tube contained within a tire casing, the sealant composition becomes uniformly distributed therein on rotation of the tire and/or tube.

DETAILED DESCRIPTION OF THE INVENTION

The present one-shot component sealant for pneumatic tires, as heretofore stated, has as its essential sealant functioning components from about 60 to about 100 parts, 80 parts being preferred, of a liquid low molecular weight hydroxy terminated polybutadiene diol, from about ½ to about 5 parts, 0.8 part being preferred, of an antioxidant, from about 4.0 to about 7.0 parts, 5.65 parts being preferred, of a polymeric isocyanate, the ratio of NCO/OH being within the range of from about 0.65 to about 1.0, and, from about 0.5 to about 2.5 parts, 2 parts being preferred, of polyurethane catalyst.

As stated, for optimization, the sealant composition per se is preferably blended with a sealant optimizing amount of a masterbatch having as its essential components:

a. from about 100 to about 600 parts, about 345 parts being preferred, of a rubber process oil;
b. from about 25 to about 200 parts, about 115 parts being preferred, of a low molecular weight rubber such as polyisobutylene;
c. from about 5 to about 50 parts of a plasticizing or tackifying substance, with 20 parts being preferred of, for example, a thermoplastic hydrogenated rosin ester, i.e., Foral 85;
d. from about 1 to 15 parts, more preferable from 2 to 5 parts of a butyl rubber curing resin;
e. from about 0.5 to about 5.0 parts, 2.5 parts being preferred, of a nonvolatile antioxidant; and
f. from about 5 to about 50 parts, 10 parts being preferred, of a finely ground carbon black.

The preceding novel composition in both its broadest and preferred embodiments can be effectively cured in, for example, 5 minutes at a temperature of from about 80° to about 85° C. after application to the inner surface of a pneumatic tire.

The functionality of each of the components, that is of both the sealant composition and the masterbatch will now be characterized.

The selected low molecular weight hydroxy-terminated polybutadiene diol will have a molecular weight within the range of 400 to about 5,000; the preferred molecular weight range is from 1,200 to 3,000, with about 0.80 milliequivalents per gram of hydroxyl and a Brookfield viscosity of 73 poises at 25° C. The low molecular weight diol preferred to practice the invention is ARCO R45-HT, a water clear liquid commercially available from ARCO Chemical.

The component preferably selected to chain extend the above diol is Mondur MRS-10 (polymeric MDI-polymethylene polyphenylisocyanate), a pale yellow liquid having a molecular weight ranging from 260 to 300, and a specific gravity of 1.22 at 25° C. Functionally equivalent diisocyanates, such as toluene diisocyanate can also be used.

Antioxidant protection was found to be essential in our sealant composition. Naugard 431, a nonvolatile high molecular weight hindered phenolic antioxidant having a viscosity average of 6,400 cps. at 100° F., as measured by the Brookfield rotation viscometer, was mixed according to the procedure of the first example. Naugard 431, is a viscous, amber-yellow liquid having a flash point (COC) of 390° F. and a specific gravity of 1.080 at 25° C. This preferred antioxidant is commercially available from Uniroyal, Inc.

As shown in Example I, the catalyst selected to practice our invention was Fomrez UL-22, a high-performance organotin mercaptide complex, commercially available from Witco Chemical, as a pale yellow liquid with a flash point, (COC) of 185° C. An outstanding feature of this catalyst is its resistance to hydrolysis. Although Fomrez UL-22 is preferred, other known tin catalysts, e.g., dibutyltin dilaurate for the curing of polyurethanes, can be utilized effectively to achieve substantially the same results.

The following materials were utilized to practice the invention set forth in Example II.

Vistanex LM-MS Butyl, a low molecular weight polymer of the "liquid" rubber type having a molecular viscosity average of 8,700 to 10,000 (Staudinger) or 40,000 (Flory) was used in the preparation of this sealant composition. The LM grades of Vistanex are clear permanently tacky, very viscous polyisobutylenes having a specific gravity of 0.92. This series of low molecular weight polyisobutylenes are highly paraffinic hydrocarbon polymers, composed of long straight-chain molecules having terminal unsaturation only. Because of this molecular structure they are relatively inert and resistant to chemical or oxidative attack, but are soluble in hydrocarbon solvents. Vistanex is light colored, odorless, tasteless and nontoxic.

The low molecular weight polyisobutylenes, of which Vistanex LM-MS is the preferred example, are extremely compatible in the presence of a paraffinic oil, e.g., Sunpar process oils from Sun Oil Company. These oils are characterized structurally by a predominant number of paraffinic side chains (55% min. Cp) and thus are highly saturated. Their resistance to oxidation increases as their molecular weight increases. Sunpar oils are dewaxed at low pour points, and their volatility is quite low compared to naphthenic and aromatic oils, as indicated by their higher flash points. Paraffinic oils, i.e., Sunpar 130 were used to practice this invention. Sunpar 120, is a blend of Sunpar 130 and 150 paraffinic process oil, having a flash point (COC) of about 465° F., a molecular weight ranging between 440 to 530 and a specific gravity of 0.8714 at 25° C. The viscosity of Sunpar 130 should be in the range of from about 208 to 300 SUS at 100° F.; a preferred range is 300 to 400. The appropriately selected processing oil imparts better sealant flexibility, lower volatility, polymer compatibility and handling properties during mixing and application of the sealant composition into which it has been incorporated.

Other ingredients utilized in the practice of this invention include Arofene 595, an oil-soluble, heat reactive, alkyl-phenolic butyl rubber curing resin manufactured by Ashland Chemical. Arofene 595, used in the experimental work discussed hereinbelow, exists as turbid yellow-amber flakes having a softening point of 80° to 90° C. and a specific gravity at 25° C. of 1.030 to 1.050.

The tackifying or plasticizing substances which are preferably included in our sealant composition formulation are low molecular weight materials such as rosin esters (e.g., Foral 85). Foral 85 is a pale, thermoplastic hydrogenated rosin ester that has outstanding resistance to oxidation and to discoloration caused by heat and aging, a softening point of 80°–88° C., an acid number of 3–10, and a specific gravity of 1.070 at 25° C.

Another low molecular weight rosin ester useful in practicing the invention set forth in Example II is Abalyn. Abalyn, a methyl ester of rosin, is an ambercolored tacky, viscous liquid having an acid number of 6–8, a flash point of 180° C. and a specific gravity of 1.030 at 25° C.

Other tackifying or plasticizing organic substances that can be used in our sealant composition are low molecular weight materials, i.e., hydrogenated rosin esters (e.g., Foral 85, Foral 105, Pentalyn H, Staybelite Ester 3, Staybelite 10); aliphatic petroleum hydrocarbon resins (e.g., Piccopale 85, Piccopale 100, Piccotac A); polyterpene resins derived from alpha-pinene (e.g., Piccolyte A100 and A115); beta-pinene resins made from styrene and related monomers (e.g., Piccolastic A75, D100 and E100); and resins made from dicyclopentadiene (e.g., Piccodiene 2215, Piccodiene 2240 and Res-Org-D-0060). The tackifying materials mentioned hereinabove, for the most part, have low acid numbers (below 25 to 30), softening points near 100° C., and are commercially available from Hercules, Inc.

Resin is a term for a variety of hard, brittle, solid or semi-solid organic substances. Resins can be either natural, i.e., rosin, or synthetic, i.e., coumaroneindene and phenol-formaldehyde. Rosin is basically an extract of pine wood obtained by extracting pine wood with naphtha and distilling off the volatile fraction.

Other known commercially available plasticizing or tackifying organic materials can be used by one skilled in the art, to obtain essentially the same results. In other words, the desired level of tack in the sealant composition can be achieved with a minimum of routine experimentation and optimization of the known tackifying material.

The amount of plasticizing or tackifying organic material which can be utilized can vary from about two to about 20 to 25 parts for every one part of butyl rubber curing resin. A more desirable range is from about two to twelve parts to every one part of butyl rubber curing resin, with a range of approximately 8 to 1 being preferred.

Our sealant composition can further include, if desired, various appropriate additional compounding ingredients, i.e., carbon black, inorganic mineral fillers and the like. Low-cost fillers, for example, Austin black or Kofil 500, finely ground bituminous coal dust having a specific gravity of 1.22 at 25° C. are appropriate to incorporate into the sealant composition.

In our one-shot sealant composition, the preferred mole ratio of NCO to OH is about 0.65 to 1.0; if the mole ratio of NCO to OH is increased to above 0.70 to 1.0 the resulting cured sealant shows shorter elongation, loss of tack, slower sealant recovery, poorer tear properties, poorer adhesion to the rubber substrate and inadequate sealing at the site of the nail puncture. When the mole ratio of NCO to OH is decreased to 0.55 to 1.0, the resulting sealant composition was found to be undercured and does not function properly.

An antioxidant is added to a rubber compound to protect the finished product against deterioration by oxygen. Oxygen attacks at the site of a double bond (=) to form an ozonide. Antioxidants belong to the class of compounding ingredients known as protective agents, and their mode of action is considered to be removal of oxygen or by so directing the cause of oxidation that the physical properties of the rubber are retained. There are two main types—amines and phenolic antioxidants; these classes are well known.

In the sealant composition of the present invention distinct advantages result in that users thereof are faced with lower volatility than many of the prior art systems, and, the processing is facilitated with the use of a rubber process oil. In addition, improved cured sealant aging properties result, as well as improvement in tack and sealant elongation. Improved cured sealant tensile and tear properties and improved cured sealant flexibility is also achieved. The present novel system is essentially liquid in nature and when catalyzed with a polyurethane catalyst becomes cured and functional as a sealant. When the catalyst component is an organotin mercaptide catalyst, the present composition is considered to also function as a high temperature stabilizer that retards reversion of the urethane component.

The following examples are representative and illustrate the broadest and the preferred compositions of the novel sealant herein described and claimed as utilized to effectively function in pneumatic tires. In each of these examples, the proportions are by weight unless otherwise specified and each example can be varied within the total context of the instant specification as it would be comprehended by one skilled in the art to achieve essentially the same results. These examples should not be construed to limit the scope of the claimed invention.

EXAMPLE I

A one-shot component sealant was prepared by mixing 80 parts of a liquid low molecular weight polybutadiene diol (R45HT—ARCO Chemical) at 73° F., said diol having about 0.83 milliequivalent per gram of hydroxyl; 0.8 part Naugard 431, a nondiscoloring, nonvolatile hindered phenolic antioxidant—(Uniroyal Chemical), and 5.65 parts Mondur MRS-10 (polymeric MDI—polymethylene polyphenylisocyanate—avg. molecular wt. of 260-300—Mobay Chemical) were stirred vigorously for about 60 seconds. The final additive, 2.0 part Fomrez UL-22 high-performance organotin mercaptide catalyst—supplied by the Witco Chemical Company of the U.S.A. was added and the resulting mixture stirred for at least 30 seconds before the sealant composition was poured into an aluminum pan and cured 5 minutes at 80°-85° C. Flowing was not evident after a 5 minute cure. In this composition, the mole ratio optimum of NCO to OH, is about 0.65 to 1.0. When the mole ratio of NCO to OH was decreased to 0.55 to 1.0, the resulting sealant was undercured and did not function properly.

EXAMPLE II a. Masterbatch Preparation—492.36 parts

A paraffinic rubber process oil, 343.02 parts of a highly saturated, nonfunctional hydrocarbon type (i.e., Sunpar 130-Sun Oil) having a specific gravity at 60° F. of 0.871 and an Aniline Point Index (API) at 60° F. of 31.1 was mixed with 114.34 parts of a low MW Vistanex LM Butyl rubber having a molecular weight viscosity average of 8,700 to 10,000 (Staudinger) or 40,000 (Flory), said butyl rubber becoming solubilized in said paraffinic rubber process oil on mixing at 90° to 95° C. To this mixture of uncured butyl rubber solubilized in paraffinic rubber process oil cooled to about 50° C. was added 20 parts Foral 85, a hydrogenated thermoplastic rosin ester (from Hercules, Inc.). The sealant composition can include various appropriate additional compounding ingredients, i.e., 2.50 parts Arofene 595 an oil-soluble, heat reactive, alkyl-phenolic resin—Ashland Chemical; 2.50 parts Naugard 431, a nondiscoloring, nonvolatile hindered phenolic antioxidant—Uniroyal Chemical, and lastly, 10 parts Austin black, finely ground bituminous coal shale from Slab Fork Coal Company; these components were thoroughly mixed. In this formulation, an equivalent amount of Abalyn, a methyl ester of rosin, can be used as an effective replacement for Foral 85. Abalyn is an amber-colored, near-neutral, tacky, viscous, water insoluble liquid commercially available from Hercules, Inc.

b. One-Shot Component Sealant

The one-shot component sealant was prepared by mixing 40 parts of a liquid low molecular weight hydroxy terminated polybutadiene diol (R45HT—ARCO Chemical) having about 0.83 milliequivalent per gram of hydroxyl into 49.24 parts of the masterbatch mixed and solubilized as shown above together with 2.02 parts (1.22 grams/ml.) of Hylene TM (80/20 blend of toluene—2,4 and 2,6 diisocyanate); about 0.4 parts Fomrez UL-22, a high performance organotin catalyst (sp. Gravity 1.03) from Witco Chemical is then added. Hylene TM serves to chain extend the liquid diol.

In this composition, the mole ratio optimum of NCO to OH, is about 0.70 to 1.0. The resulting cured sealant showed excellent elongation and tack, good recovery, nail coating and adhesion to the rubber substrate (cured innerliner stock) and adequate sealing at the site of the nail puncture when cured 5 minutes at 80°-85° C.

The above composition can also be sprayed or extruded onto the innerliner of a tire using conventional mixing and metering equipment; said tire was rotated to uniformly distribute the sealant composition onto the inner surface of the tire primarily in the adjacent tread and sidewall areas.

The applied sealant was then cured on the tire innerliner (from decoupling groove to decoupling groove) for about 15 minutes at about 80°-85° C. The thickness of the spray applied sealant was uniform and about one eighth to five sixteenths inch in depth. When punctured by a nail, a small hole was made in the tire tread and the sealant remained stuck at the innerliner and became adhered as well to the nail when inserted and when removed; the resultant puncture became completely sealed.

The preceding representative examples can be varied by one skilled in the art, and still achieve the same significant results, by substituting functionally equivalent components as would be understood by one skilled in the art to be capable of functioning in a similar manner to each of those set forth in the specific examples; this can be achieved with a minimum of routine experimentation and is considered to represent a part of the claimed invention.

The sealant composition of the present invention has significant utility in any pneumatic tire, from bike sizes to giant off-the-road size whether the tire utilizes an inner tube or is one of the tubeless variety.

What is claimed is:

1. A pneumatic tire having a sealant functioning amount of a cured sealant composition contiguous to the inner surface of the inner liner of said tire, said sealant being a curable, storage-stable and solventless one-shot component sealant for pneumatic tires having as its essential sealant functioning components from about 60 to about 100 parts of a liquid low molecular weight hydroxy terminated polybutadiene diol, from about ½ to about 5 parts of an antioxidant, from about 4 to about 7 parts of an polymeric isocyanate, the ratio of NCO/OH being within the range of from about 0.65 to about 1.0, and, from about 0.5 to about 2.5 parts of a polyurethane catalyst blended with a sealant optimizing amount of a masterbatch having as its essential components:
   a. from about 100 to about 600 parts of a rubber process oil;
   b. from about 25 to about 200 parts of a low molecular weight rubber;
   c. from about 5 to about 50 parts of a tackifier;
   d. from about 1 to about 15 parts of a butyl rubber curing resin;
   e. from about 0.5 to about 5.0 parts of a nonvolatile antioxidant; and
   f. from about 5 to about 50 parts of finely ground bituminous coal dust.

2. A pneumatic tire having a sealant functioning amount of a cured sealant position contiguous to the inner surface of the inner liner of said tire, said sealant being a curable, storage-stable and solventless one-shot component sealant for pneumatic tires having as its essential sealant components about 80 parts of a liquid low molecular weight diol, about 0.8 part of an antioxidant, about 5.65 parts of a polymeric isocyanate, the ratio of NCO/OH being within the range of from about 0.65 to about 1.0, and, about 2 parts of a polyurethane catalyst blended with a sealant optimizing amount of a masterbatch having as its essential components:
   a. about 345 parts of a rubber process oil;
   b. about 115 parts of a low molecular weight rubber;
   c. about 20 parts of a tackifier;
   d. from about 2 to about 5 parts of a butyl rubber curing resin;
   e. about 2.5 parts of a nonvolatile antioxidant; and
   f. about 10 parts of finely ground bituminous coal dust.

3. A sealant composition for pneumatic tires comprising a blend of;
   (A) a curable, storage-stable and solventless one-shot component sealant for pneumatic tires having as its essential sealant functioning components from about 60 to about 100 parts of a liquid low molecular weight hydroxy-terminated polybutadiene diol, from about 0.5 to about 5 parts of an non-volatile antioxidant, from about 4 to about 7 parts of an polymeric isocyanate, the ratio of NCO/OH being within the range of from about 0.65 to about 1.0, and from about 0.5 to about 2.5 parts of a polyurethane catalyst; and
   (B) a sealant amount of a masterbatch having as its essential components:
   a. from about 100 to about 600 parts of a rubber process oil;
   b. from about 25 to about 200 parts of a low molecular weight rubber;
   c. from about 5 to about 50 parts of a tackifier;
   d. from about 1 to about 15 parts of a butyl rubber curing resin;
   e. from about 0.5 to about 5.0 parts of a non-volatile antioxidant; and
   f. from about 5 to about 50 parts of carbon black bituminous coal dust and mixtures thereof.

4. The sealant composition of claim 3 wherein component f. is finely ground, bituminous coal dust.

5. The sealant composition of claim 3 wherein the polybutadiene diol has a molecular weight within the range of 400 to about 5000.

6. The sealant composition of claim 5 wherein the isocyanate is polymeric MDI-polymethylene polyphenyl isocyanate or toluene diisocyanate.

7. A sealant composition for pneumatic tires comprising a blend of;
   (A) a curable, storage-stable and solventless one-shot component sealant for pneumatic tires having as its essential sealant components about 80 parts of a liquid low molecular weight diol, about 0.8 parts of a non-volatile antioxidant, about 5.65 parts of a polymeric isocyanate, the ratio of NCO/OH being within the range of from about 0.65 to about 1.0, and about 2 parts of a polyurethane catalyst; and
   (B) a sealant amount of a masterbatch having as its essential components:
   a. about 345 parts of a rubber process oil;
   b. about 115 parts of a low molecular weight rubber;
   c. about 20 parts of a tackifier;
   d. from about 2 to about 5 parts of a butyl rubber curing resin;
   e. about 2.5 parts of a nonvolatile antioxidant; and
   f. about 10 parts of carbon black bituminous coal dust and mixtures thereof.

8. The sealant composition of claim 7 wherein component f. is finely ground, bituminous coal dust.

9. The sealant composition of claim 7 wherein the polybutadiene diol has a molecular weight within the range of 400 to about 5000.

10. The sealant composition of claim 9 wherein the isocyanate is polymeric MDI-polymethylene polyphenyl isocyanate or toluene diisocyanate.

* * * * *